United States Patent [19]

Ribordy et al.

[11] Patent Number: 5,085,312
[45] Date of Patent: Feb. 4, 1992

[54] PARTS HANDLING MACHINE

[75] Inventors: James E. Ribordy, South Beloit, Ill.; Teresa D. Popanz, Beloit, Wis.

[73] Assignee: Rinky-Dink Systems, Inc., Roscoe, Ill.

[21] Appl. No.: 661,419

[22] Filed: Feb. 26, 1991

[51] Int. Cl.$^5$ .............................................. B65H 1/00
[52] U.S. Cl. ............................ 198/463.4; 198/468.2; 198/478.1; 414/223; 414/224; 414/225
[58] Field of Search ............... 414/222, 223, 224, 225, 414/226, 332, 564, 589, 590, 787; 198/339.1, 346.2, 463.4, 468.2, 468.8, 478.1

[56] References Cited

U.S. PATENT DOCUMENTS

| | | | |
|---|---|---|---|
| 2,860,760 | 11/1958 | Yeo et al. | 198/468.8 X |
| 3,130,031 | 4/1964 | McMahon, Jr. et al. | 414/224 X |
| 4,602,710 | 7/1986 | Bell, Jr. et al. | 198/468.2 |
| 4,614,018 | 9/1986 | Krall | 414/225 X |
| 4,620,359 | 11/1986 | Charlton et al. | 414/223 X |
| 4,666,358 | 5/1987 | Wojciechowski | 414/224 X |

Primary Examiner—Frank E. Werner
Assistant Examiner—James Keenan
Attorney, Agent, or Firm—Leydig, Voit & Mayer

[57] ABSTRACT

A machine for picking up and placing parts includes an oscillating dial which carries a shuttle, an intermittently rotatable turntable which carries several angularly spaced fixtures, and vertically reciprocable lift platens which carry angularly spaced transfer or working devices, at least one of the devices being a transfer device having a gripper for holding and releasing parts. A part fed into the shuttle is carried to a transfer station by the shuttle and is picked up by the gripper of the transfer device as the latter moves downwardly through a long stroke and between adjacent fixtures. After the transfer device has been retracted upwardly through a long stroke to clear the fixtures, the turntable is indexed through one step to bring a fixture into underlying relation with the transfer device. The transfer device then is moved downwardly through a short stroke to place the part on the underlying fixture and thereafter is retracted upwardly through a short stroke to permit the turntable to index through another step and again locate adjacent fixtures on opposite sides of the transfer device preparatory to the next long downward stroke of the transfer device.

10 Claims, 3 Drawing Sheets

PARTS HANDLING MACHINE

BACKGROUND OF THE INVENTION

This invention relates generally to a machine for handling parts and is in the general category of pick and place machines.

Specifically, the invention relates to a machine of the type in which parts are delivered one-by-one by a suitable feeder to a pick-up or receiving station of the machine. At the receiving station, each part is picked up, is transferred, and is placed on a part holder or fixture. The fixture then is advanced through one or more work stations where assembly operations, welding, testing or other operations are performed on the part. The machine usually includes several fixtures mounted on an intermittently rotatable dial or turntable so as to enable multiple parts to pass through multiple work stations around the turntable during each revolution of the turntable.

In a typical pick and place machine, the transfer device for picking up, transferring and placing the parts usually moves along mutually perpendicular rectilinear coordinates. Thus, the transfer device may move horizontally outwardly from the fixture to a position above the part, downwardly to pick up the part, upwardly and then back inwardly toward the fixture with the part, and then downwardly to place the part on the fixture. After the work operations have been completed, another transfer device undertakes the same motions but in reverse order to pick the part up from the fixture and to deliver the part from the machine. Because of the rectilinear movements, such transfer devices are relatively complex and, in addition, are required to travel outside the periphery of the turntable in order to pick up and deliver parts.

SUMMARY OF THE INVENTION

The general aim of the present invention is to provide a new and improved parts handling machine in which the construction of the transfer device is significantly simplified and in which the transfer device is capable of picking up and placing parts without need of traveling inwardly and outwardly with respect to the turntable.

A more detailed object of the invention is to achieve the foregoing through the provision of a machine having a pick and place transfer device which moves strictly vertically and through sequenced strokes of alternately different lengths. Indexing of the turntable is timed in relation to the transfer device such that the transfer device moves downwardly through a long stroke and between two adjacent fixtures to pick up a part. After the transfer device lifts the part upwardly between the two fixtures, the turntable is indexed to position one of the fixtures beneath the transfer device. Thereafter, the transfer device is lowered through a short stroke to place the part on the underlying fixture. After upward retraction of the transfer device through a short stroke, the turntable is again indexed to locate adjacent fixtures in a position to enable the transfer device to move downwardly between the fixtures during the next operating cycle. In this way, parts are picked up and placed by a transfer device which simply moves upwardly and downwardly along a vertical path and without being required to move outwardly and inwardly with respect to the turntable.

The invention also resides in the provision of a unique shuttle which moves back and forth, preferably with an oscillating motion, to receive parts from an infeed system and to position the parts for handling by the pick-up device. In addition, the invention is characterized by the simple and compact mechanism for supporting the turntable and the shuttle for angular movement and the transfer device for reciprocating movement.

These and other objects and advantages of the invention will become more apparent from the following detailed description when taken in conjunction with the accompanying drawings.

DETAILED DESCRIPTION OF THE PREFERRED EMBODIMENT

Figure 1:
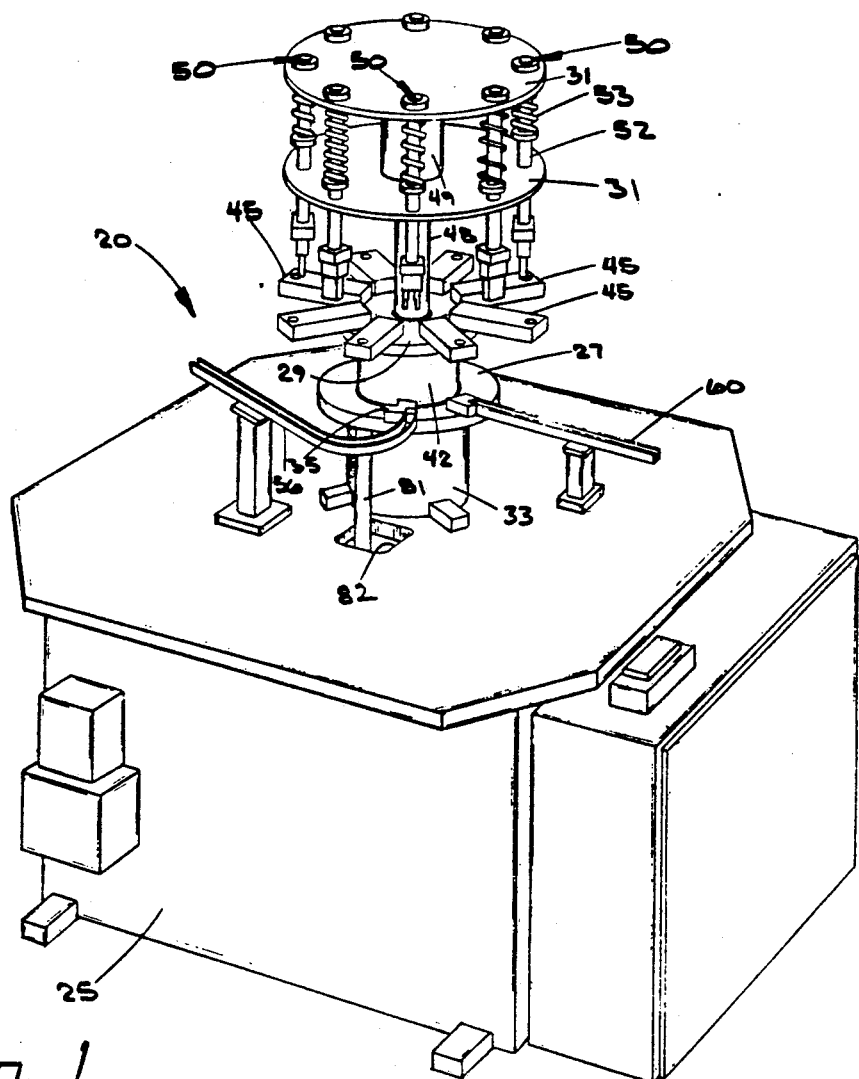
FIG. 1 is a perspective view of a new and improved parts handling machine incorporating the unique features of the present invention.

For purposes of illustration, the invention has been shown in the drawings as incorporated in a machine 20 for handling parts 21 (FIG. 2) and specifically for receiving parts one-by-one from a supply and for advancing the parts through work stations where various assembly, manufacturing or testing operations may be performed on the parts. For simplicity, the parts 21 have been shown herein as being spherical balls but it should be appreciated that the machine may handle small parts of various types and shapes.

In general, the machine 20 includes a box-like base in the form of a cabinet 25 (FIG. 1) which houses various drive components of the machine. According to the invention, three primary components are supported by and are located above the cabinet. These components include a lower shuttle dial 27, an index dial or turntable 29 located above the shuttle dial, and a pair of vertically spaced discs or platens 31 located above the turntable.

Figure 4:
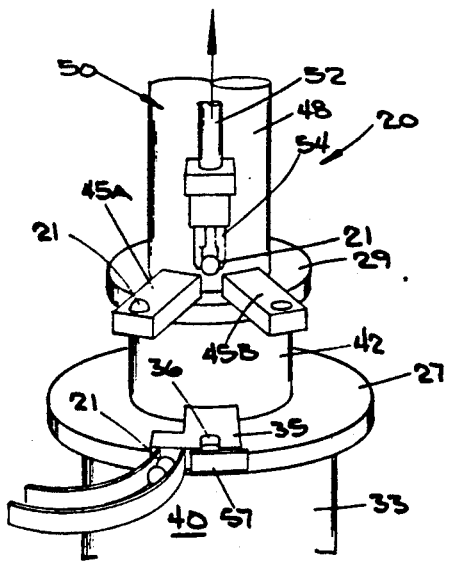

The shuttle dial 27 is circular, is disposed in a horizontal plane and is supported to rotate about a vertically extending and relatively large diameter tubular hub 33 which is fixed rigidly to the cabinet 25. Carried on the outer periphery of the dial 27 is a shuttle 35 whose upper side is formed with a pocket 36 (FIG. 4) for receiving and holding a part 21. In operation of the machine 20, the shuttle dial 27 is intermittently rotated back and forth through a short predetermined angle (e.g., 7½ degrees) and causes the shuttle 35 to oscillate between a part-receiving station 39 (FIG. 2) and a part-transfer or pick-up station 40 (FIG. 4).

In this instance, the turntable 29 is also circular, is somewhat smaller in diameter than the shuttle dial 27 and is located in a horizontal plane spaced vertically above the shuttle dial. The turntable is supported on the upper end of a tubular shaft 42 (FIG. 1) which extends upwardly from the cabinet 25 and through the larger hub 33, the shaft 42 being journaled in the hub 33. Fixed to the turntable 29 and extending radially outwardly from the outer periphery thereof are several angularly spaced part holders or fixtures 45 (FIG. 1). Herein, the fixtures have been shown as being flat and horizontal plates. Each fixture is formed with a pocket 46 (FIG. 2) in its upper side for receiving a part 21 and, if desired, may be formed with multiple pockets or other means for receiving multiple parts.

In the specific machine 20 which has been illustrated, eight fixtures 45 are spaced equally around the turntable 29. During operation of the machine, the turntable 29 is rotated intermittently and, in this case, indexes through sixteen steps for each full revolution. Thus, the angular distance of each index step is equal to one-half the pitch between adjacent fixtures.

The platens 31 (FIG. 1) are so-called lift platens which are rotationally stationary but which are adapted to reciprocate upwardly and downwardly. The platens are in the form of two vertically spaced circular discs which herein are larger in diameter than the turntable 29. The platens are mounted on the upper end portion of a hollow shaft 48 which extends upwardly from the cabinet 25 through the shaft 42. A center bearing block 49 holds the platens in fixed vertically spaced relation.

Eight angularly spaced transfer or work mechanisms or devices 50 are carried by the lift platens 31. Each device 50 includes a vertically extending rod 52 which preferably but not necessarily is slidably supported by the platens for up and down sliding. A coil spring 53 on each rod normally holds the rod in a downward position with respect to the platens but is capable of yielding and allowing the rod to shift upwardly relative to the platens in the event the rod encounters an obstruction during the downward stroke of the platens.

The lower ends of the rods 52 carry various tooling for performing desired operations on the parts 21. Such tooling may, for example, take the form of welding heads, crimping dies, screwdriving heads or testing or measuring devices. At least one of the rods 52 carries means 54 for selectively gripping and releasing parts 21. Such means may comprise pivoted fingers adapted to swing together to hold a part and away from one another to release a part, or may comprise a suction cup to which vacuum is adapted to be selectively applied and released to cause the cup to pick up and release a part.

In accordance with the invention, and for a purpose to be explained subsequently, the platens 31 are reciprocated vertically so as to cause each rod 52 to sequentially move downwardly through a long stroke (e.g., a stroke of 3"), to return upwardly through the long stroke, to move downwardly through a short stroke (e.g., a stroke of 1") and then to return upwardly through the short stroke. By moving the rod 52 with the gripping means 54 in such a manner, the gripping means may pick up parts 21 at the transfer station 40 and place the parts on the fixtures 45 without need of undertaking any horizontal outward or inward movement relative to the turntable 29.

The operation of the machine 20 as described thus far will be explained with reference to the diagrammatic views of FIGS. 2 to 9. Illustrated diagrammatically in these views is a feed track 56 along which parts 21 are delivered one-by-one to the receiving station 39.

Figure 2:
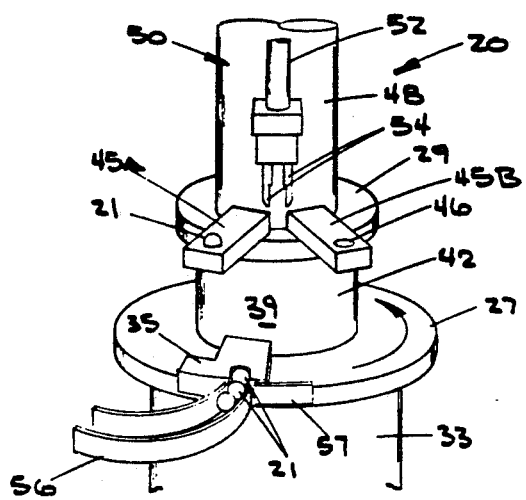
FIGS. 2 through 9 are schematic views which diagrammatically illustrate successive steps occurring at one station of the machine in a cycle in which a part is delivered to the machine, is picked up, is placed on a fixture, and is indexed for performance of a work operation.
Figure 3:
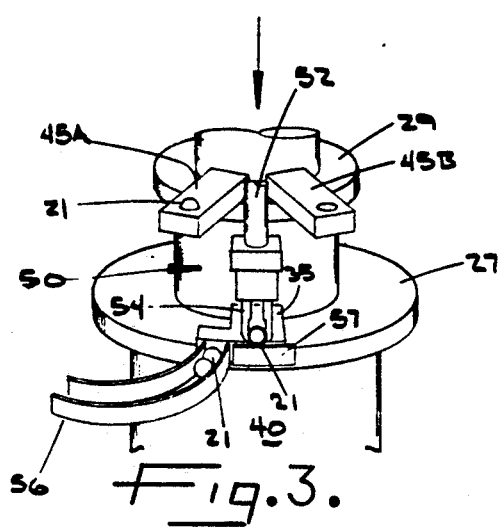

At the start of a cycle, the shuttle 35 is positioned in the receiving station 39 as shown in FIG. 2 and is located such that its pocket 36, which is open to the outer side of the shuttle, is aligned with the feed track 56 so as to receive the endmost part 21 in the track. When the shuttle is so positioned, the turntable 29 dwells in a position in which two adjacent leading and trailing fixtures 45A and 45B are disposed above and on opposite sides of the transfer station 40 so that, in essence, the two fixtures straddle the transfer station in vertically spaced relation therewith. The rod 52 of the transfer device 50 with the gripping means 54 is retracted fully upwardly to a home position in which the gripping means are located above and between the two fixtures 45A and 45B and are aligned vertically with the transfer station 40.

A cycle is initiated by rotating the shuttle dial 27 counterclockwise (FIG. 2) through a short distance. This causes the shuttle 35 to swing from the position shown in FIG. 2 to the position shown in FIG. 3 so as to deliver the part 21 in the pocket 36 of the shuttle from the receiving station 39 to the transfer station 40. As the shuttle moves from the station 39 to the station 40, it blocks off the end of the feed track 56 to prevent additional parts from escaping from the track. A fixed plate 57 (FIGS. 2 and 3) on the cabinet 25 closes off the open outer side of the pocket 36 of the shuttle and retains the part in the pocket as the shuttle moves from the station 39 to the station 40.

The shuttle 35 dwells upon reaching the transfer station 40. As the shuttle moves toward the transfer station 40, the platens 31 are lowered through their long stroke. This causes the gripping means 54 to move downwardly from the home position shown in FIG. 2, through the space between the adjacent fixtures 45A and 45B and downwardly toward the transfer station 40. The gripping means 54 arrive at the transfer station just shortly after the shuttle dwells and close upon the part 21 in the pocket 36 of the shuttle (see FIG. 3).

Figure 5:
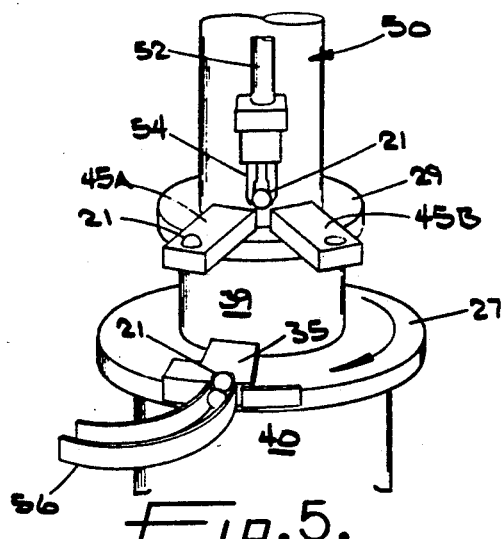
Figure 6:
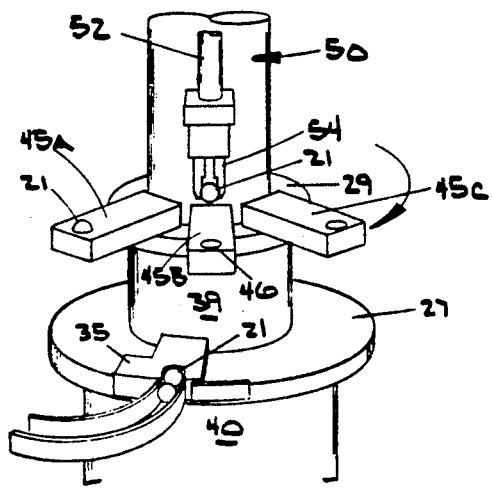

After the gripping means 54 have closed on the part 21, the lift platens 31 are raised through their long stroke. This causes the gripping means to carry the part 21 upwardly through the space between the fixtures 45A and 45B and to stop in the home position with the part located at an elevation above the fixtures as shown in FIG. 4. Once the part 21 has cleared the shuttle 35, the latter is turned clockwise and is returned to the receiving station 39 as shown in FIG. 5 to pick up the next part.

As soon as the upwardly moving part 21 in the gripping means 54 clears the fixtures 45A and 45B, the turntable 29 is indexed clockwise through a step which is equal in angular length to one-half the pitch between the fixtures. This brings the fixture 45B to a position shown in FIG. 6 in which such fixture is located directly above the transfer station 40 and directly below the gripping means 54 with the part 21.

Figure 7:
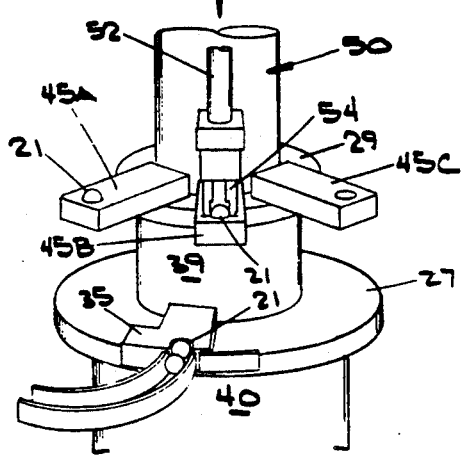
Figure 8:
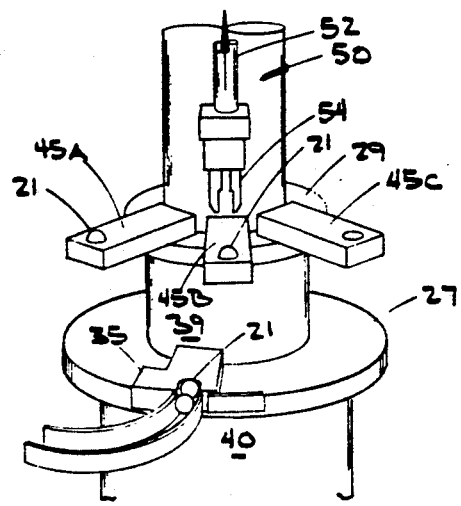

When the turntable 29 dwells, the platens 31 are lowered through their short stroke to cause the gripping means 54 to place the part 21 in the pocket 46 of the underlying fixture 45B (see FIG. 7). After the gripping means 54 have released the part 21, the platens 31 are raised through their short stroke in order to retract the gripping means to the home position clear of the part and the fixture 45B as shown in FIG. 8.

Figure 9:
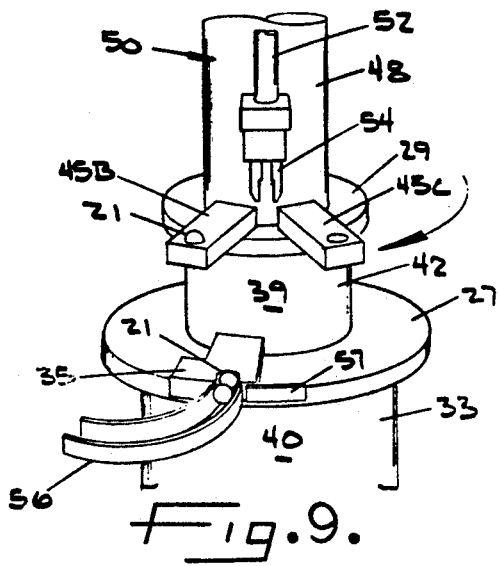

The turntable 29 then is indexed one step to move the loaded fixture 45B to the downstream side of the transfer station 40 and to advance the following fixture 45C to the upstream side of the transfer station (see FIG. 9). This completes the loading cycle for the first part and leaves the various components in position to begin the next loading cycle.

While the foregoing describes the steps of a specific loading cycle, it should be appreciated that variations are possible. For example, the machine 20 could be timed such that the shuttle 35 has a part 21 waiting in the transfer station 40 when the turntable 29 completes its second dwell. In this way, the gripping means 54 may be started downwardly through their long stroke as soon as the turntable dwells and without waiting for the shuttle to transfer the part from the receiving station 39 to the transfer station 40. Also, in certain cases, the shuttle may be eliminated completely if the feed track 56 is equipped with an escapement device enabling parts to be delivered one-by-one from the track and directly to the transfer station 40.

As the turntable 29 indexes each loaded fixture 45 beyond the transfer station 40, various operations may be performed on the part 21 by appropriate tooling carried on other ones of the rods 52. Such tooling moves idly and between adjacent fixtures 45 when the platens 31 are shifted downwardly through their long stroke but is positioned directly above the fixture and is capable of performing a work operation on the part when the platens are shifted downwardly through their short stroke. When the tooling carried by the rods 52 is idle, work-performing mechanisms (not shown) located between adjacent rods may be activated to perform operations on the parts when the turntable dwells and the platens shift downwardly through their long stroke.

As shown in FIG. 1, a discharge track 60 is located on the cabinet 25 in angularly spaced relation to the feed track 56. A shuttle similar to the shuttle 35 and a transfer device similar to the transfer device 50 with the gripping means 54 may be located adjacent the discharge track to pick completed parts out of the fixtures for delivery to the discharge track. The transfer device for discharging parts acts similarly to the transfer device for loading parts except that it picks a part out of a fixture during the short downward stroke of the platens, moves upwardly to allow the fixtures to index, moves downwardly through a long stroke to place the part on the discharge shuttle (or directly to the track 60) and then moves upwardly through a long stroke to again permit indexing of the fixtures.

In passing, it will be pointed out that two or more of the transfer devices 50 may be provided with gripping means 54 and may be associated with angularly spaced feed tracks 56 so as to serve as loading devices. In this way, multiple parts 21 may be loaded onto each fixture 45 at angularly spaced transfer stations.

Figure 10:
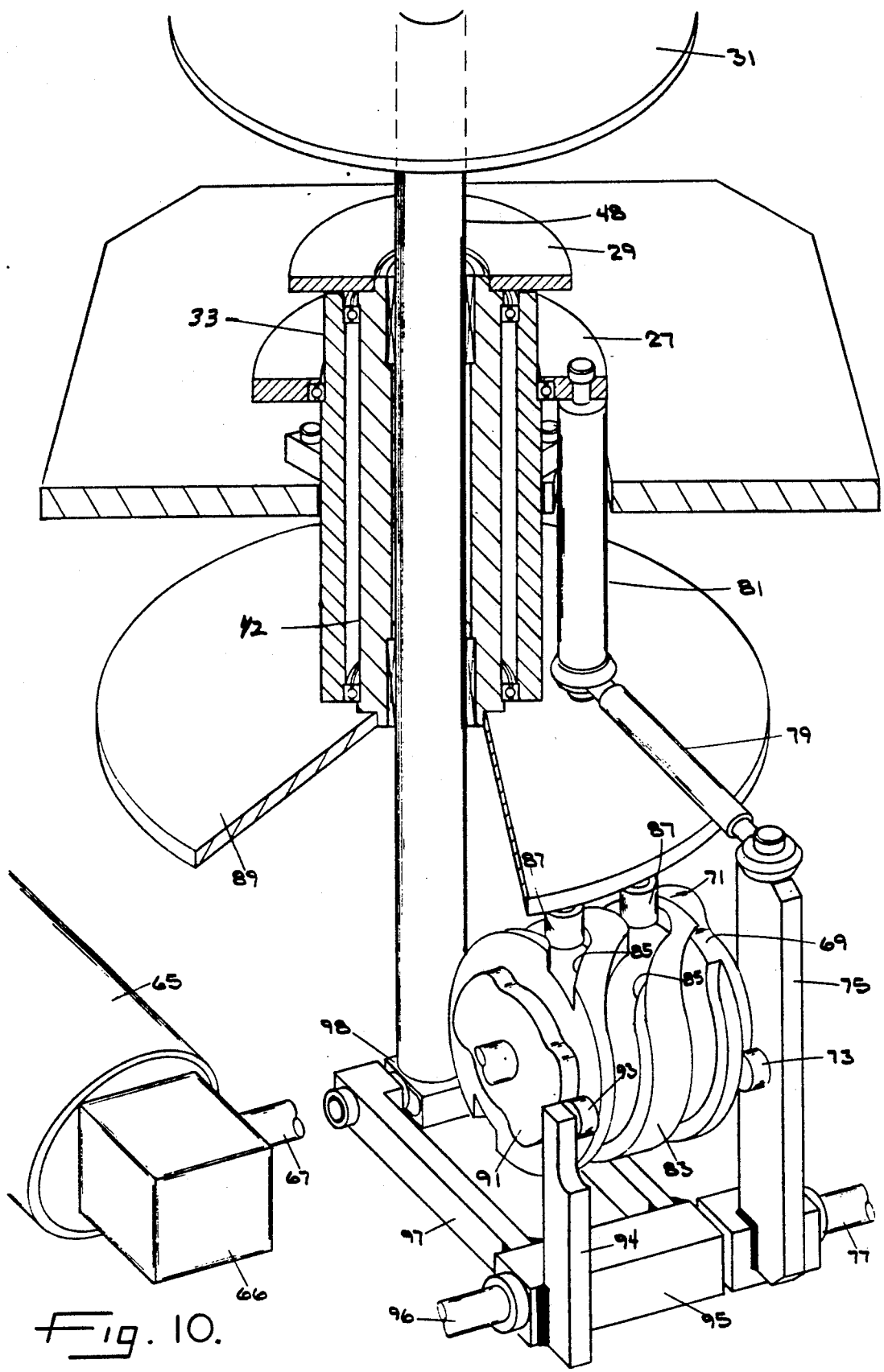
FIG. 10 is a perspective view showing the basic drive mechanism for the machine.

Mechanism for oscillating the shuttle dial 27, indexing the turntable 29 and reciprocating the lift platens 31 is shown in FIG. 10. Such mechanism includes an electric motor 65 which acts through a speed reducer 66 to rotate a cycle shaft 67 on a continuous basis. Secured to one end of the shaft is a cam 69 having an axially extending lobe 71. Each time a follower 73 encounters the lobe, a bar 75 is rocked about a pivot shaft 77, the follower being carried by the bar. Connected pivotally to the upper end of the bar is one end of a link 79 whose other end is connected to a vertical rod 81. The latter projects upwardly through an opening 82 (FIG. 1) in the cabinet 25 and is operably connected to the shuttle dial 27. During each revolution of the cycle shaft 67, the cam 69 oscillates the bar 75, the link 79 and the rod 81 first in one direction and then the other in order to move the shuttle 35 from the receiving station 39 to the transfer station 40 and back.

A barrel cam 83 (FIG. 10) also is secured to the cycle shaft 67 and includes two cam grooves 85 which receive followers 87. Several followers 87 are spaced angularly around and depend from a circular plate 89 located in the cabinet 25 and connected to the lower end of the shaft 42 of the turntable 29. As the cycle shaft 67 rotates, one follower 87 enters one of the grooves 85 at about the same time an adjacent follower 87 leaves the other groove 85. The followers 87 and grooves 85 coact to index the plate 89, and thus the turntable 29, through two steps for each revolution of the cycle shaft 67.

Reciprocation of the lift platens 31 is effected by a cam 91 secured to the cycle shaft 67 and coacting with a follower 93 on a bar 94 which is supported by a bearing block 95 to rock about a pivot shaft 96. A rod 97 extends from the bearing block and is connected to another block 98 which is secured to the lower end of the shaft 48. The cam 91 is shaped such that, for each revolution of the cycle shaft 67, the shaft 48, and thus the lift platens 31, are lowered through a long stroke, are raised through the long stroke, are lowered through a short stroke and then are raised through the short stroke.

From the foregoing, it will be apparent that the present invention brings to the art a new and improved machine 20 which achieves a pick and place action solely through vertical motion as a result of shifting the lift platens 31 through long and short strokes and timing the indexing of the turntable in accordance with the movement of the platens. Such timing includes locating leading and trailing fixtures 45 on opposite sides of the transfer station during one dwell period and locating a fixture directly above the transfer station during the next dwell period.

The coaxial hub 33 and shafts 42 and 48 result in a compact package. In addition, the hollow shaft 48 may be used as a conduit or manifold for flexible hoses for supplying pressurized air or vacuum to the work stations.

Those familiar with the art will appreciate that the machine 20 may be tooled in different ways. In many cases, the manufacturer of the basic machine may supply essentially the cabinet 25, the drive mechanism of FIG. 10, the hub 33 and the shuttle dial 27, the shaft 42 and the turntable 29, and the shaft 48 and the lift platens 31. The ultimate user then may equip this basic structure with feed tracks, fixtures and tooling suited to the ultimate user's particular needs. Thus, the basic structure of the machine affords the ultimate user a high degree of flexibility and enables the user to easily automate for the specific operations at hand.

We claim:

1. A machine for handling parts adapted to be delivered one-by-one to a pick-up station, said machine comprising a base, a turntable spaced above said base and supported by said base to rotate intermittently about an upright axis, a plurality of angularly spaced and generally horizontal part holders rotatable with and extending generally radially from said turntable, there being two adjacent leading and trailing part holders located above and on opposite sides of said pick-up station every other time said turntable dwells, transfer mechanism for selectively picking up and releasing a part, said transfer mechanism being movable upwardly and downwardly on said base and having a home position, means for moving said transfer mechanism downwardly through a stroke of predetermined length and along a predetermined path from said home position, through a space between said two adjacent part holders and to said pick-up station every other time said turntable dwells whereby said transfer mechanism picks up a part at said station, said moving means thereafter shifting said transfer mechanism upwardly along said predetermined path to said home position, means for thereafter indexing said turntable to cause the trailing one of said two adjacent holders to advance angularly to and to dwell in a receiving position directly above said pick-up station and directly below the home position of said transfer mechanism, means for thereafter shifting said transfer mechanism downwardly through a stroke shorter than said predetermined length so as to place the part on said one holder, said shifting means thereafter retracting said transfer mechanism upwardly toward said home position, and said indexing means thereafter rotating said turntable to move said one holder away from its position directly above said pick-up station and to a dwell position immediately downstream of the pick-up station and to move another holder to a standby position immediately upstream of the pick-up station.

2. A machine as defined in claim 1 further including a shuttle supported on said base to move back and forth between said pick-up station and a receiving station spaced from said pick-up station, said shuttle obtaining a part at said receiving station and delivering said part to said pick-up station upon being moved to said pick up station, and means for moving said shuttle back and forth between said stations in timed relation with the movement of said transfer mechanism.

3. A machine as defined in claim 2 in which said shuttle is supported to oscillate between said stations about said upright axis.

4. A machine as defined in claim 3 further including an upright tubular hub supporting said shuttle to oscillate relative to said base, and an upright tubular shaft extending upwardly through said hub and supporting said turntable to rotate relative to said base.

5. A machine as defined in claim 4 further including a second shaft extending upwardly through said first shaft and movable upwardly and downwardly therein, said transfer mechanism being connected to and being movable with said second shaft.

6. A machine as defined in claim 5 in which said second shaft is tubular.

7. A machine for handling parts adapted to be delivered one-by-one to a receiving station at the machine, said machine comprising a base, a shuttle supported on said base to oscillate back and forth about an upright axis between said receiving station and an angularly spaced transfer station, said shuttle obtaining a part at said receiving station and transferring the part angularly to said transfer station, a turntable mounted on said base above said shuttle and intermittently rotatable about said upright axis, a plurality of angularly spaced and generally horizontal part holders rotatable with and extending generally radially from said turntable, there being two adjacent leading and trailing part holders located above and on opposite downstream and upstream sides, respectively, of said transfer station every other time said turntable dwells, a transfer mechanism for selectively picking up and releasing a part, said transfer mechanism being movable upwardly and downwardly on said base and having a home position, means for moving said transfer mechanism downwardly through a stroke of predetermined length and along a predetermined path from said home position, through a space between said two adjacent part holders and to said transfer station every other time said turntable dwells whereby said transfer mechanism picks up a part at said transfer station, said moving means thereafter shifting said transfer mechanism upwardly along said predetermined path to said home position, means for thereafter indexing said turntable to cause the trailing one of said two adjacent holders to advance angularly to and to dwell in a receiving position directly above said transfer station and directly below the home position of said transfer mechanism, means for thereafter shifting said transfer mechanism downwardly through a stroke shorter than said predetermined length so as to place the part on said one holder, said shifting means thereafter retracting said transfer mechanism upwardly toward said home position, said indexing means thereafter rotating said turntable to move said one holder to the downstream side of said transfer station and to move another holder to the upstream side of said transfer station.

8. A machine as defined in claim 7 further including means for moving said shuttle from said receiving station to said transfer station before said transfer mechanism shifts downwardly to said transfer station and for returning said shuttle from said transfer station to said receiving station after said transfer mechanism shifts upwardly from said transfer station.

9. A machine as defined in claim 8 in which said turntable indexes through two steps between the time said shuttle is first shifted to said transfer station and the time said shuttle is next shifted to said transfer station.

10. A machine as defined in claim 9 in which said shuttle moves from said receiving station to said transfer station in a direction opposite to the direction of rotation of said turntable.

* * * * *